United States Patent
de Beus

(10) Patent No.: US 9,100,620 B2
(45) Date of Patent: Aug. 4, 2015

(54) METHOD AND SYSTEM FOR ADDING A COLOR BAR AS A RENDERING JOB TICKET ATTRIBUTE

(75) Inventor: Eric A. de Beus, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1031 days.

(21) Appl. No.: 12/787,137

(22) Filed: May 25, 2010

(65) Prior Publication Data

US 2011/0292410 A1 Dec. 1, 2011

(51) Int. Cl.
*H04N 1/00* (2006.01)
*H04N 1/46* (2006.01)
*H04N 1/60* (2006.01)
*G06F 3/12* (2006.01)
*G06K 15/02* (2006.01)

(52) U.S. Cl.
CPC ............... *H04N 1/46* (2013.01); *G06F 3/1204* (2013.01); *G06F 3/1254* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 5,163,368 A | 11/1992 | Pensavecchia et al. | 101/136 |
| 5,357,448 A | 10/1994 | Stanford | 364/526 |
| 5,992,318 A | 11/1999 | DiBello et al. | 101/181 |
| 7,092,119 B1 * | 8/2006 | Hinds et al. | 358/1.9 |
| 7,460,706 B2 | 12/2008 | Doumoto et al. | 382/167 |
| 7,546,048 B2 | 6/2009 | Schwartz et al. | 399/60 |
| 2002/0171871 A1 * | 11/2002 | Catt et al. | 358/1.18 |
| 2003/0179395 A1 * | 9/2003 | Kodama et al. | 358/1.9 |
| 2004/0182262 A1 * | 9/2004 | Seymour | 101/211 |
| 2004/0184051 A1 * | 9/2004 | Bailey | 358/1.9 |
| 2005/0125726 A1 * | 6/2005 | Harper et al. | 715/517 |
| 2006/0033958 A1 * | 2/2006 | d'Entrecasteaux | 358/1.16 |
| 2006/0048042 A1 * | 3/2006 | Sembower et al. | 715/500 |
| 2006/0092442 A1 * | 5/2006 | Such et al. | 358/1.9 |
| 2006/0221360 A1 * | 10/2006 | Yoshida | 358/1.1 |
| 2008/0222526 A1 * | 9/2008 | Morales et al. | 715/722 |
| 2008/0239365 A1 * | 10/2008 | Salgado et al. | 358/1.15 |
| 2008/0239381 A1 * | 10/2008 | Oshima | 358/1.15 |
| 2009/0040563 A1 * | 2/2009 | Mestha et al. | 358/2.1 |
| 2009/0063718 A1 * | 3/2009 | Sekine et al. | 710/8 |
| 2009/0244621 A1 * | 10/2009 | Young et al. | 358/1.16 |
| 2011/0176151 A1 * | 7/2011 | Gauronski et al. | 358/1.9 |

* cited by examiner

*Primary Examiner* — Beniyam Menberu
(74) *Attorney, Agent, or Firm* — Kermit D. Lopez; Luis M. Ortiz; Ortiz & Lopez, PLLC

(57) ABSTRACT

A system and method for automatically adding a color bar as a rendering job ticket attribute and dynamically generating the color bar based on the rendering job attribute. The color bar can be added in association with the rendering job ticket along with a set of sub-attributes that include parameters associated with the color bar. The dynamic color bar can be automatically configured to include spot colors associated with the rendering job and the parameters can be specified in a device-independent way. Upon receiving the rendering job with the dynamic color bar attribute, the rendering device can render each page of the job in association with the color bar. The dynamic color bar generation instructions can be detected in the job ticket generated by a print driver thereby enhancing the use of the color bar in a color rendering application.

20 Claims, 4 Drawing Sheets

METHOD AND SYSTEM FOR ADDING A COLOR BAR AS A RENDERING JOB TICKET ATTRIBUTE

TECHNICAL FIELD

Embodiments are generally related to image processing systems and methods. Embodiments are also related to color management techniques. Embodiments are additionally related to color bar and rendering job ticket attributes utilized in image processing applications.

BACKGROUND OF THE INVENTION

Color image processing systems often include an input device (e.g., a scanner, copy machine, etc), an image manipulation device (e.g., a workstation), and one or more output devices (e.g., monitors, rendering devices, color print presses, etc.). Within such systems, consistency of color reproduction across system components is desirable. It is also desirable to attain similar consistency of color reproduction when image files are transferred between different color image processing systems.

Color bars are rows of small colored squares rendered outside a trim area of a document and employed by a press operator to control ink density, dot gain, color registration, and other image processing attributes. Such color bars may include, for example, samples of a process, overprint, or spot colors, and can be represented in the form of a solid block or in a set of varying tint levels. Color bars can be acquired from a library of digital images, which can be applied to the pages of a job during a prepress operation.

In most prior art approaches, the color bars can be manually selected by an operator based on the color content of a particular job and their placement in the proper location on a page. Such a selection can also take into account the crop and trim areas of the page. A manual process of this type is typically consuming and expensive, and detracts from the usefulness of the utilized automated workflow system.

Based on the foregoing, it is believed that a need exists for an improved system and method for automatically adding a color bar as a rendering job ticket attribute, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved image processing system and method.

It is another aspect of the disclosed embodiments to provide for an improved color bar management technique.

It is a further aspect of the disclosed embodiments to provide for an improved method for adding a color bar attribute in association with a rendering job ticket.

The aforementioned aspects and other objectives and advantages can now be achieved as described herein. A system and method for automatically adding a color bar as a rendering job ticket attribute and dynamically generating the color bar based on the rendering job attribute (e.g., color content, trim area, etc) is disclosed herein. The color bar can be added in association with the rendering job ticket, along with a set of sub-attributes (e.g., position, size, color, shape) that include parameters associated with the color bar.

The disclosed dynamic color bar can be automatically configured to include spot colors associated with the rendering job and the parameters can be specified in a device-independent manner. Upon receiving the rendering job with the dynamic color bar attribute, the rendering device can render each page of the job in association with the color bar.

The dynamic color bar generation instructions can be detected in the job ticket generated by a print driver, thereby enhancing the use of the color bar in a color rendering application and other potential image processing applications. The job ticket can be selected from a set of existing job tickets and/or created via a user interface. The pre-existing standard job ticket can also be modified via a user interface to reflect the desired characteristics of a particular job. Such an approach eliminates the need for a licensed library of color bar images and includes spot colors loaded on the rendering device. The color bars can be generated in association with prepress software, thereby reducing the processing time with respect to a client.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
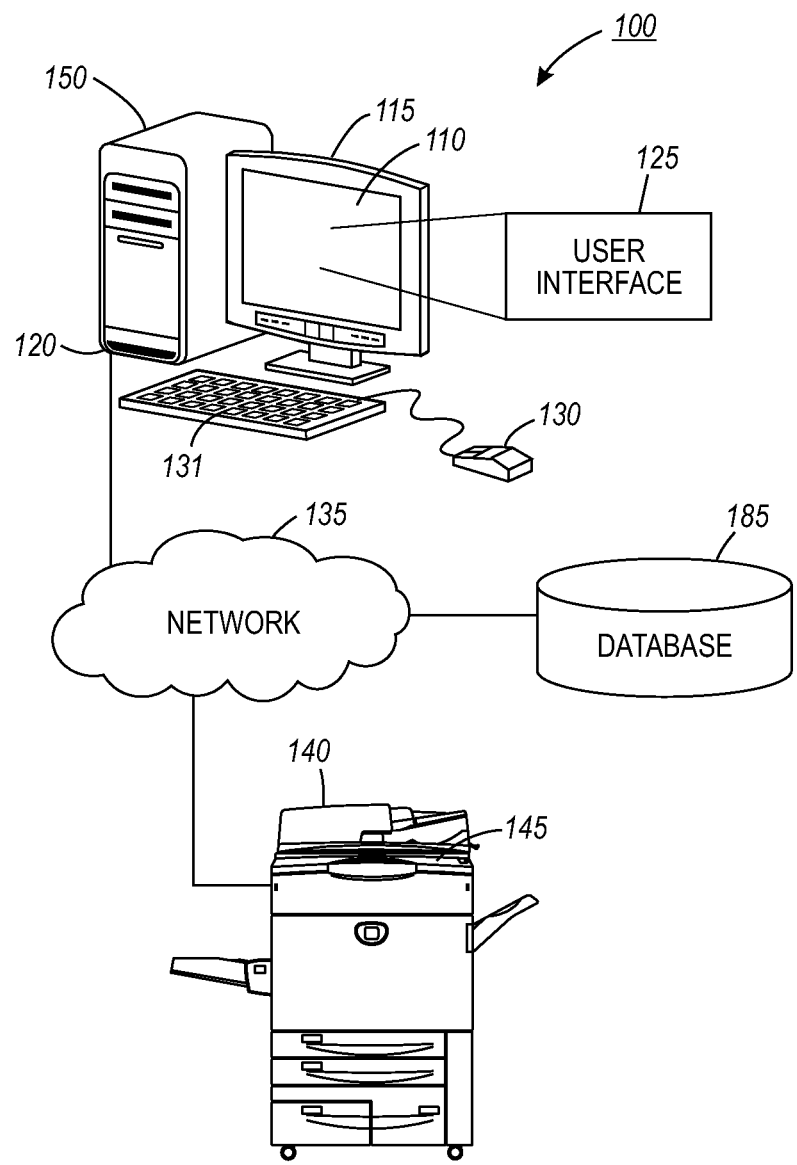
FIG. 1 illustrates an example of a rendering device coupled to a data-processing apparatus through a network, in accordance with the disclosed embodiments.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 includes a rendering device 140 coupled to a data-processing apparatus 110 through a network 135. The data-processing apparatus 110 may be, for example, a personal computer or other computing device, and generally includes a central processor 120, a display device 115, a keyboard 131, and a pointing device 130

(e.g., mouse, track ball, pen device, or the like). Additional input/output devices, such as the rendering device 140, may be included in association with the data-processing apparatus 110 as desired.

Note that as utilized herein, the term rendering device 140 may refer to an apparatus or system such as a printer, scanner, fax machine, copy machine, etc., and/or a combination thereof. Preferably, rendering device 140 is capable of multiple rendering functions such as printing, copying, scanning, faxing, etc. In some embodiments, rendering device 140 may be implemented with a single rendering function such as printing. In other embodiments, rendering device 140 can be configured to provide multiple rendering functions such as scanning, faxing, printing, and copying. Note that the rendering devices 142 and 144 described in greater detail herein are analogous or similar to rendering device 140.

The data-processing apparatus 110 can be coupled to the rendering device 140 through a computer network 135. The network 135 may employ any network topology, transmission medium, or network protocol. The network 135 may include connections such as wire, wireless communication links, or fiber optic cables. The rendering device 140 includes a user interface 145, such as a panel menu. The panel menu may be used to select features and enter other data in the rendering device 140. Such interfaces may include, for example, touch screens having touch activated keys for navigating through an option menu or the like.

A rendering device driver program can be installed on the data-processing apparatus 110 and can reside on the host device's hard drive 150. The rendering device driver program may be activated through an application interface so that a user may generate a rendering job with the rendering device driver for processing by the rendering device 140. The data-processing apparatus 110 also includes a GUI 125 for communicating rendering device features for processing, for example, a rendering job to a user and accepting the user's selection of available rendering device features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

Note that the user interface as utilized herein generally refers to a type of environment that represents programs, files, options, and so forth by means of graphically displayed icons, menus, and dialog boxes on a screen. The input device of the rendering devices 140, 142 and 144 may be a local user interface such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to disclosed and alternative embodiments, which can be implemented in the context of an example data-processing apparatus 110 and rendering device 140 as depicted in FIG. 1. The disclosed embodiments, however, are not limited to any particular application or any particular environment. Instead, those skilled in the art will find that the disclosed system and method of the present invention may be advantageously applied to a variety of system and application software, including database management systems, word processors, and the like. Moreover, the disclosed embodiments may be practiced or implemented on a variety of different platforms, including Macintosh, UNIX, LINUX, and the like. Therefore, the description of the exemplary embodiments, which follows, is for purposes of illustration and not considered a limitation.

Figure 2:
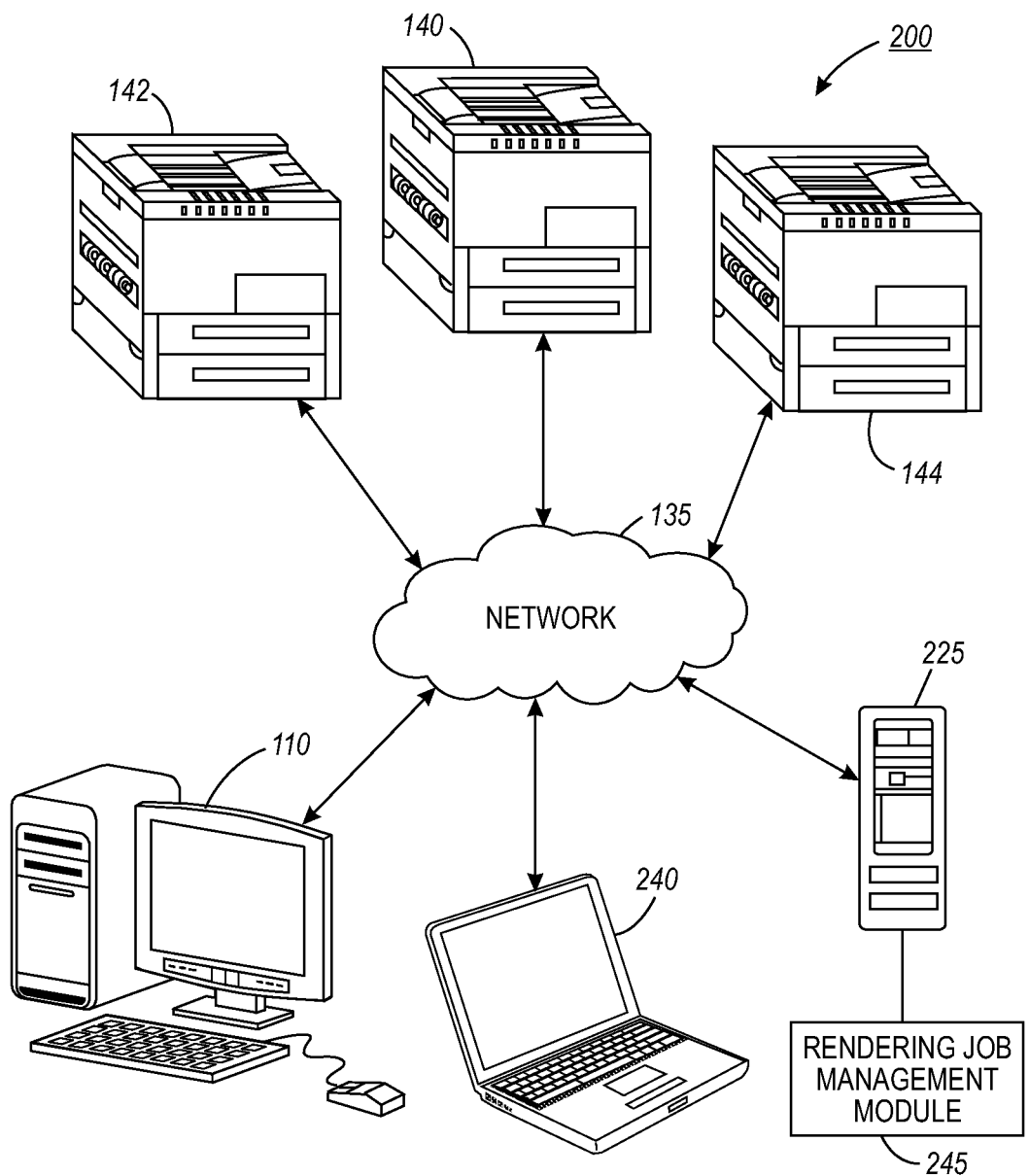
FIG. 2 illustrates a graphical representation of a rendering job management system associated with a network, in accordance with the disclosed embodiments.

FIG. 2 illustrates a graphical representation of a rendering job management system 200 associated with a network 135, in accordance with the disclosed embodiments. Note that in FIGS. 1-4, identical or similar blocks are generally indicated by identical reference numerals. The rendering job management system 200 generally includes one or more rendering devices 140, 142, and 144, data-processing system 110, laptop 240, and server 225 configured in association with the network 135. Data-processing system 110 depicted in FIG. 2 can be, for example, a server. Other devices such as, for example, desktops, network devices, palmtops, mobile phones, etc. may also be included in the network infrastructure 135, as service providers. The rendering devices 140, 142, and 144 can be located remotely with respect to each other, or alternatively, they may be located locally with respect to each other.

The rendering device 140 can be an office machine which incorporates the functionality of multiple devices in one so as to provide centralized document management, document distribution, and production in a large-office setting and the like. The typical rendering device 140 can act as a combination of a printer, scanner, photocopier, fax, and e-mail. While three multi-function devices 140, 142 and 144 are shown by way of example, it is to be appreciated that any number of rendering devices can be linked to the network 135 such as two, four, six or more rendering devices. In general, the rendering devices 140, 142, and 144 can be employed to perform a rendering output function (e.g., printing, scanning, copying, faxing, etc.) within a networked environment. Each MFD 140, 142, and 144 in the enterprise network 135 may collect its own data and store a persistent history associated with the data locally on the database 185 accessible by the rendering devices 140, 142, and 144. Note that rendering devices 140, 142, and 144 are generally analogous to one another.

The rendering job management system 200 includes a rendering job management module 245 that can be employed to consolidate and manage various rendering jobs in the network 135. The management module 245 can assist users to easily locate, manage, and render jobs. Further, the management module 245 can be employed to automatically add a color bar as a rendering job ticket attribute and dynamically generate the color bar based on a rendering job attribute. Note that as utilized herein, the term "module" may refer to a physical hardware component and/or to a software module.

In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as USB drives, Flash memory drives, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

The color bar 365 further includes a set of sub-attributes such as, for example, types of colors 370, size 372, position 374, and shape 376 associated with the color bar 365. The parameters associated with the color bar 365 can include solid squares or tints and the kinds of colors (process, overprint, spot, or some combination), and parameters that specify the position of the color bar 365 in a device-independent way. For example, the position of the color bar 365 can be specified by a number of points measuring inward from a top-right corner of the page, or a number of points measuring outward from the top-right corner of the trim area of the page. The job ticket can also specify color bar size, either as a minimum or maximum box size or as a minimum or maximum total bar size, and color bar distribution, i.e., color bars on every page, or color bars on the first page only, etc. A sample job ticket fragment can be illustrated as follows.

```
<dynamic_color_bar>
  <type>solid</type><colors>process,spot</colors>
  <position><trim_box><top>2pt</top><right>2pt</right></trim_box></position>
  < distribution>every page</ distribution>
</dynamic_color_bar>
```

Figure 3:
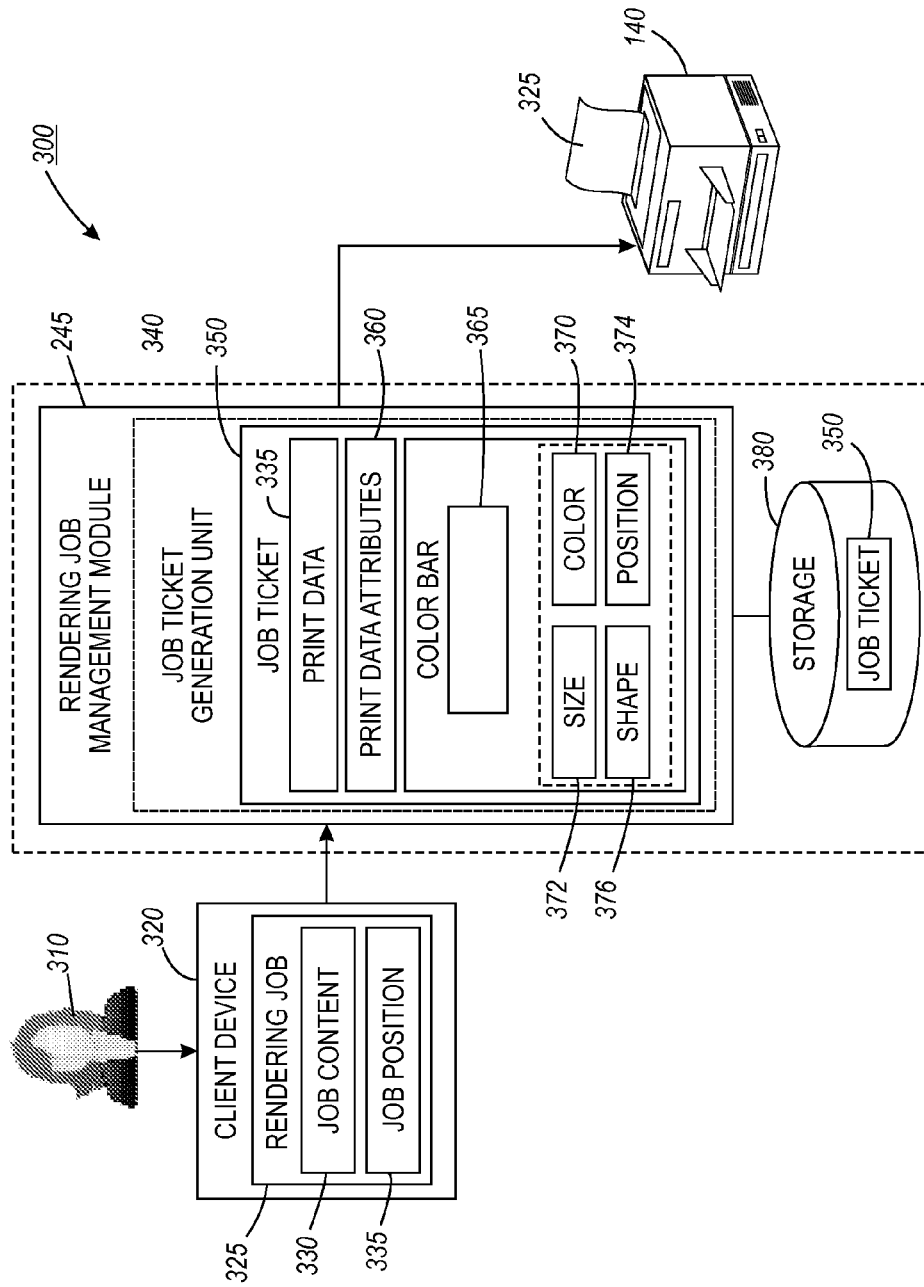
FIG. 3 illustrates a block diagram of the rendering job management system, in accordance with the disclosed embodiments.

FIG. 3 illustrates a block diagram 300 of the rendering job management system 200, in accordance with the disclosed embodiments. The rendering job management system 200 may include the rendering job management module 245 to consolidate and manage rendering jobs 325 with respect to the rendering device 140. The rendering device 140 generally supports varying types of rendering jobs 325. The rendering job management module 245 provides the rendering job 325 with a rendering job ticket 350 to render a document as per the requirements of a user 310.

The rendering job ticket 350 can be provided, for example, by a set of instructions transmitted to the rendering device 140 along with a document to instruct the rendering device 140 to render the document in a specified format and with specified features, and to specify exceptions to that format for specified pages, or additional specified features for the exceptional pages. The job ticket 350 generally includes print data 355 and print data attributes 360 based on which document can be rendered. The rendering job tickets 350 can be attached to the rendering job 325 by selecting from a set of existing job tickets 350 stored in a storage unit 380. The rendering job tickets 350 can be created "on-the-fly" via a job ticket generation unit 340 and the job tickets 350 can be stored in the storage unit 380 for future usage. A pre-existing standard job ticket 350 can also be modified via the user interface 125 in order to reflect the known or desired characteristics of a particular job.

The rendering job ticket 350 can further include a color bar 365 as an attribute in order to dynamically generate colors with respect to a rendering job during a rendering application. In general, color bar can be often provided in the form of a graphically displayed horizontal and/or vertical strip located at the top or bottom of design menus and are employed to assign colors to elements and certain styles. The color bars can also be typically implemented as a series of small squares that represent all the colors in the rendering job. The color bars can include four boxes representing C (Cyan), M (Magenta), Y (Yellow) and K (Black) and/or variations thereof. C, M, Y, and K constitute the basic colors involved in color rendering applications. If jobs contain spot colors in addition to CMYK, color bars can be modified to include these spot colors as well.

An operator can specify only the content 330 and position 335 of the rendering job 325 and the rendering device 140 automatically generates the color bars 365 based on the rendering job color content, trim area, etc. The dynamic color bar 365 can be automatically configured to include spot colors associated with the rendering job 325 thereby eliminating a need to search for the color bar 365 with most appropriate spot colors. Upon receiving the rendering job 325 with the dynamic color bar attribute, the rendering device 140 can render the rendering job 325 in association with the color bar 365 for each page. Such dynamic color bar generation instructions can be detected in the job ticket 350 generated by a print driver thereby enhancing the use of color bars 365 in color rendering applications. The color bars 365 can be portable so that neither the operator nor the rendering job management module 245 needs to recalculate the color bars 365, if the rendering 325 job is to be rendered on a different rendering device 140. Such rendering job management module 245 can enhance the color rendering function of a rendering device 140 and eliminate the need of a licensed library of color bar images 365.

Figure 4:
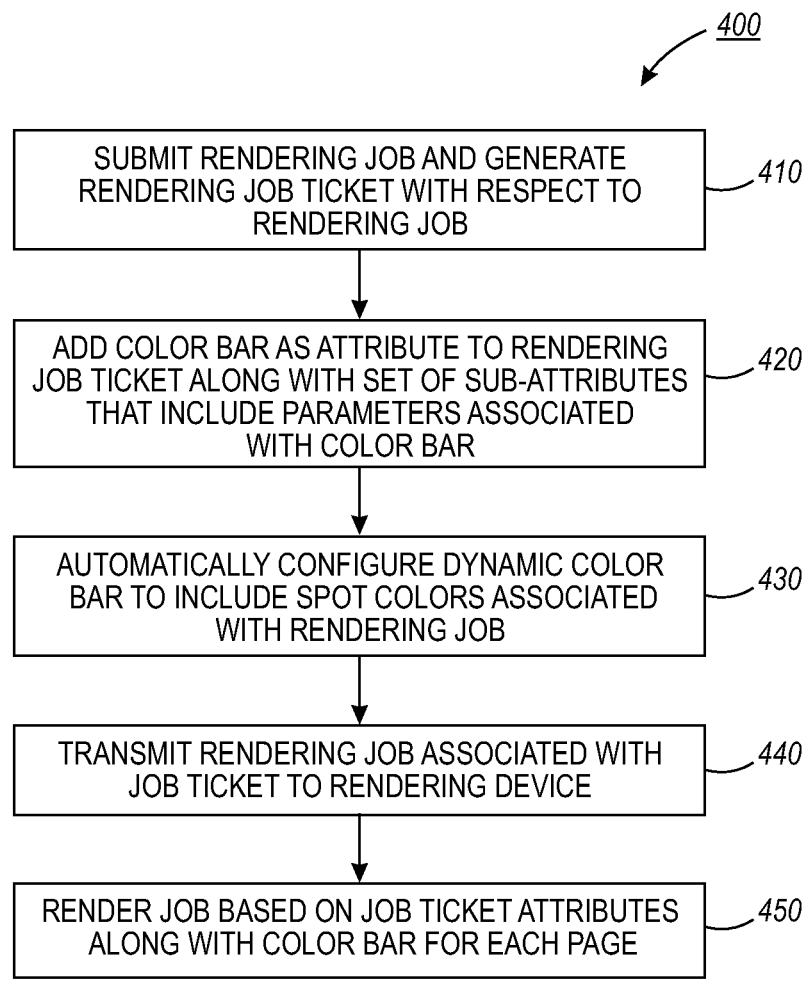
FIG. 4 illustrates a high level flow chart of operation illustrating logical operational steps of a method for automatically adding a color bar as a rendering job ticket attribute and dynamically generating the color bar based on the rendering job attribute, in accordance with the disclosed embodiments.

FIG. 4 illustrates a high level flow chart of operation illustrating logical operational steps of a method 400 for automatically adding the color bar 365 as a rendering job ticket 350 attribute and dynamically generating the color bar 365 based on the rendering job ticket attribute 360, in accordance with the disclosed embodiments. The rendering job 325 can be submitted to the rendering device 140 via the client device 320 and the rendering job ticket 350 with respect to the rendering job 325, as illustrated at block 410. The color bar 365 can be added as an attribute 360 to the rendering job ticket 350 along with the set of sub-attributes 370, 372, 374 and 376 that include parameters associated with color bar 365, as indicated at block 420.

The job ticket 350 can also be selected from a set of pre-existing job tickets 350 stored in the storage unit 380. The dynamic color bar 365 can be automatically configured to include the spot colors associated with the rendering job 325, as depicted at block 430. The rendering job 325 associated with the job ticket 350 can be transmitted to the rendering device 140, as illustrated at block 440. The rendering job 325 can be rendered based on the attributes 360 associated with the color bar 365, as indicated at block 450. Such an approach eliminates a need for a licensed library of color bar images 365 and includes spot colors loaded on the rendering device, without the expense of the operator searching for a color bar image containing the correct spot color out of a large library.

The color bars 365 can be generated in association with prepress software thereby reducing the processing time with respect to a client. It is believed that by utilizing the system and approach described herein, the rendering devices can generate the color bars dynamically based on the document's color content, trim area, and other factors. Such an approach provides an enhancement to dynamic color bars to achieve the functionality required for digital color rendering device. Specifically, the disclosed embodiments add functionalities that support a variable number of color spots and color spaces.

Based on the foregoing, it can be appreciated that a method is disclosed, which includes the step of automatically adding a color bar in association with a rendering job ticket and one or more sub-attributes that include one or more parameters associated with the color bar, wherein the parameter(s) is specified in a device-independent manner. Such a method additionally includes a step of generating the color bar with respect to each page of a rendering job based on a rendering job attribute associated with the rendering job, thereby enhancing the use of the color bar with respect to a color rendering application.

In an alternative embodiment, such a method can include the step of automatically configuring the color bar to include a spot color associated with the rendering job. In still a further embodiment, such a method can include the step of detecting a dynamic color bar generation instruction via the rendering job ticket generated by a rendering device driver. In an additional embodiment, such a method can include the step of generating the color bar in association with prepress software thereby reducing a processing time with respect to a client.

In yet another embodiment (or embodiment(s)), the aforementioned sub-attributes can be one or more of the following types of attributes: a position attribute; a size attribute; a color attribute; and a shape attribute. In other embodiments, the aforementioned method can include, for example, the steps of selecting the job ticket from one or more existing job tickets; creating the job ticket on-the-fly via a user interface; and/or modifying a pre-existing standard job ticket via the user interface to reflect a desired characteristic of a particular job.

It can be further appreciated, based on the foregoing, that an embodiment is disclosed directed toward a system that includes a processor, a data bus coupled to the processor, and a computer-usable medium embodying computer code, the computer-usable medium being coupled to the data bus. In such a system, the computer program code can include instructions executable by the processor and configured for automatically adding a color bar in association with a rendering job ticket and one or more sub-attributes that include one or more parameters associated with the color bar, wherein the parameter(s) is specified in a device-independent manner; and generating the color bar with respect to each page of a rendering job based on a rendering job attribute associated with the rendering job, thereby enhancing the use of the color bar with respect to a color rendering application.

In alternative embodiment, the instructions can be further configured for automatically adjusting the color bar to include a spot color associated with the rendering job. In yet another embodiment, such instructions can be configured for detecting a dynamic color bar generation instruction via the rendering job ticket generated by a rendering device driver. In still another embodiment of such a system, the instructions can be configured for generating the color bar in association with prepress software thereby reducing a processing time with respect to a client. Additionally, the sub-attributes can include, for example, one or more of the following types of attributes: a position attribute; a size attribute; a color attribute; and a shape attribute.

In other embodiments of such a system, the instructions can be configured for selecting the job ticket from one or more existing job tickets. In other embodiments, such instructions can be configured for creating the job ticket on-the-fly via a user interface. In yet other embodiments, such instructions can be configured for modifying a pre-existing standard job ticket via the user interface to reflect a desired characteristic of a particular job.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for adding a color bar as a rendering job ticket attribute, said method comprising:
   automatically modifying a rendering job ticket comprising a plurality of job-independent rendering job attributes transmitted with a rendering job and generated by a rendering device print driver by adding a color bar generation instruction as a rendering job attribute of said plurality of job-independent rendering job attributes and a plurality of sub-attributes that include at least one parameter associated with said color bar, wherein said at least one parameter is specified in a device-independent manner;
   configuring said color bar to be portable to prevent a need to recalculate color bars, if said rendered job is to be rendered on a different rendering device; and
   dynamically generating said color bar outside of a trim area on at least one page of a rendering job based on said rendering job attribute associated with said rendering job, thereby enhancing the use of said color bar with respect to a color rendering application.

2. The method of claim 1 further comprising automatically configuring said color bar to include a spot color associated with said rendering job and eliminate a need to search for said color bar with most appropriate spot colors, if said rendering job includes spot colors in addition to C (Cyan), M (Magenta), Y (Yellow) and K (Black).

3. The method of claim 2 further comprising detecting a dynamic color bar generation instruction via said rendering job ticket generated by a rendering device driver.

4. The method of claim 2 further comprising generating said color bar in association with prepress software thereby reducing a processing time with respect to a client.

5. The method of claim 3 wherein said plurality of sub-attributes comprises at least one of all the following types of attributes:
   a position attribute;
   a size attribute;
   a color attribute; and
   a shape attribute.

6. The method of claim 5 further comprising selecting said job ticket from a plurality of existing job tickets.

7. The method of claim 5 further comprising creating said job ticket on-the-fly via a user interface.

8. The method of claim 5 further comprising modifying a pre-existing standard job ticket via said user interface to reflect a desired characteristic of a particular job.

9. A system for adding a color bar as a rendering job ticket attribute, comprising:
   a processor;
   a data bus coupled to said processor; and
   a computer-usable medium embodying computer code, said computer-usable medium being coupled to said data bus, said computer program code comprising instructions executable by said processor and configured for:
   automatically modifying a rendering job ticket generated by a rendering device print driver by adding a color bar generation instruction as a rendering job attribute and a plurality of sub-attributes that include at least one parameter associated with said color bar, wherein said at least one parameter is specified in a device-independent manner;
   configuring said color bar to be portable to prevent a need to recalculate color bars, if said rendered job is to be rendered on a different rendering device; and
   dynamically generating said color bar outside of a trim area on at least one page of a rendering job based on said rendering job attribute associated with said rendering job, thereby enhancing the use of said color bar with respect to a color rendering application.

10. The system of claim 9 wherein said instructions are further configured for automatically adjusting said color bar to include a spot color associated with said rendering job and eliminate a need to search for said color bar with most appropriate spot colors, if said rendering job includes spot colors in addition to C (Cyan), M (Magenta), Y (Yellow) and K (Black).

11. The system of claim 10 wherein said instructions are further configured for detecting a dynamic color bar generation instruction via said rendering job ticket generated by a rendering device driver.

12. The system of claim 11 wherein said instructions are further configured for generating said color bar in association with prepress software thereby reducing a processing time with respect to a client.

13. The system of claim 11 wherein said plurality of sub-attributes comprises at least one of all the following types of attributes:
   a position attribute;
   a size attribute;
   a color attribute; and
   a shape attribute.

14. The system of claim 13 wherein said instructions are further configured for selecting said job ticket from a plurality of existing job tickets.

15. The system of claim 13 wherein said instructions are further configured for creating said job ticket on-the-fly via a user interface.

16. The system of claim 13 wherein said instructions are further configured for modifying a pre-existing standard job ticket via said user interface to reflect a desired characteristic of a particular job.

17. A system for adding a color bar as a rendering job ticket attribute, comprising:
   a processor;
   a data bus coupled to said processor; and
   a computer-usable medium embodying computer program code, said computer-usable medium being coupled to said data bus, said computer program code comprising instructions executable by said processor and configured for:
   automatically modifying a rendering job ticket generated by a rendering device print driver by adding a color bar generation instruction as a rendering job attribute and a plurality of sub-attributes that include at least one parameter associated with said color bar, wherein said at least one parameter is specified in a device-independent manner;
   configuring said color bar to be portable to prevent a need to recalculate color bars, if said rendered job is to be rendered on a different rendering device;
   dynamically generating said color bar outside of a trim area on at least one page of a rendering job based on said rendering job attribute associated with said rendering job;
   automatically adjusting said color bar to include a spot color associated with said rendering job and eliminate a need to search for said color bar with most appropriate spot colors, if said rendering job includes spot colors in addition to C (Cyan), M (Magenta), Y (Yellow) and K (Black); and
   detecting a dynamic color bar generation instruction via said rendering job ticket generated by a rendering device driver, thereby enhancing the use of said color bar with respect to a color rendering application.

18. The system of claim 17 wherein said instructions are further configured for generating said color bar in association with prepress software thereby reducing a processing time with respect to a client and wherein said rendering job ticket further includes print data and print data attributes based on which document can be rendered.

19. The system of claim 18 wherein said plurality of sub-attributes comprises at least one of all the following types of attributes:
   a position attribute;
   a size attribute;
   a color attribute; and
   a shape attribute.

20. The system of claim 19 wherein said instructions are further configured for:
   selecting said job ticket from a plurality of existing job tickets;
   creating said job ticket on-the-fly via a user interface; and
   modifying a pre-existing standard job ticket via said user interface to reflect a desired characteristic of a particular job.

* * * * *